United States Patent [19] Heeks et al.

[11] 3,869,682
[45] Mar. 4, 1975

[54] SURFACE ACOUSTIC WAVE CODE GENERATOR

[75] Inventors: John Stuart Heeks, Harlow; John Josiah Crisp, Little Hadham, both of England

[73] Assignee: International Standard Electric Corporation, New York, N.Y.

[22] Filed: Apr. 10, 1974

[21] Appl. No.: 459,506

[30] Foreign Application Priority Data

May 3, 1973 Great Britain .................... 21070/73

[52] U.S. Cl. .................... 332/11 R, 332/18, 332/26, 333/30 R

[51] Int. Cl. ........................ H03c 3/28, H03k 13/00

[58] Field of Search .... 332/11 R, 11 D, 16 R, 16 T, 332/18, 19, 26; 307/260, 262, 293; 333/30 R

[56] References Cited

UNITED STATES PATENTS

| | | | |
|---|---|---|---|
| 2,923,891 | 2/1960 | Nicholson | 332/16 |
| 3,548,306 | 12/1970 | Whitehouse | 330/30 R X |
| 3,701,147 | 10/1972 | Whitehouse | 330/30 R X |

*Primary Examiner*—Alfred L. Brody
*Attorney, Agent, or Firm*—John T. O'Halloran; Menotti J. Lombardi, Jr.; Alfred C. Hill

[57] ABSTRACT

There is disclosed a phase shift modulated pseudonoise code generator. This generator employs a surface acoustic wave tapped delay line with feedback. A radio frequency phase reference signal is provided at the tapping points. The radio frequency phase of the modulated carrier is compared with the radio frequency phase of the reference signal at each tapping point from which the feedback is derived. The comparison is performed in a surface acoustic wave modulo-2 adder. This comparison overcomes the phase shift due to temperature effects.

17 Claims, 6 Drawing Figures

SURFACE ACOUSTIC WAVE CODE GENERATOR

BACKGROUND OF THE INVENTION

This invention relates to code generators using tapped delay lines, such as are used for generating pseudo-noise codes. In such generators signals representing pulse patterns are propagated along the tapped delay line and feedback signals are derived from various tapping points on the line, the feedback signals being taken to the input to the delay line with or without intermediate processing.

Many types of delay line may be used in such applications. One type of delay line that can be utilized is realized in the form of a surface acoustic wave device. In such devices surface acoustic waves are launched into the surface of a piezoelectric body by suitable transducers. The waves are propagated along well defined paths or tracks and can be wholly or partially recovered by further transducers spaced along the tracks, the degree of recovery depending on the transducer structures and the electrical circuits connected thereto.

Transducers for launching and recovering surface acoustic waves are well known. A typical transducer consists of a number of narrow closely spaced parallel metal stripes deposited on the surface of the piezoelectric material by standard photolithographic processes. Alternate stripes are connected together (where there is more than one pair) to form two sets of interdigital conductors. The geometry of the conductor pattern governs the acoustic coupling, the resonant frequency and the relative efficiency of the transducer. A delay line with 5-finger-pair input and output transducers can be expected to have an insertion loss of about 10dB (decibel). Single-finger-pair transducers generally have a loss of about 26dB. A tapped delay line can thus be realized by placing 5-finger-pair input and output transducers at the ends of a track on a piezoelectric crystal surface, e.g., lithium niobate, with single-finger-pair transducers at tapping points intermediate the input and output transducers. Such a line can be constructed to operate at an acoustic frequency of 100MHz and digital information can be propagated along the line at a bit rate of 20MHz. Each binary digital bit is represented by a sequence of 5 cycles of a 100MHz signal. Binary bits can be defined by phase modulation of the RF (radio frequency) input.

However, the use of a simple surface acoustic wave delay line in a pseudo-noise code generator is limited by temperature effects. Problems arise from the differences in the expansion and acoustic velocity coefficients of the piezoelectric material which cause a departure from an exact correspondence between the acoustic wave pattern and the tapped delay line geometry as the temperature changes.

SUMMARY OF THE INVENTION

An object of the present invention is to provide a pseudo-noise code generator employing a surface acoustic wave delay line wherein the temperature effects are overcome.

A feature of the present invention is the provision of a binary code generator comprising: a first surface acoustic wave tapped delay line; first means for generating clock signals having a repetition rate equal to the binary code bit rate; second means coupled to the first means and the first delay line for inserting phase modulated RF signals into the input of the first delay line, the second means being under control of the clock signals; third means coupled to the first delay line to derive first and second output signals from first and second tapping points of the first delay line; fourth means to derive for the first and second tapping points first and second phase reference signals by which the RF phase of the first and second output signals of the first and second tapping points can be checked; fifth means coupled to the first and second tapping points and the fourth means to compare the first and second output signals with respect to the first and second phase reference signals resulting in third and fourth output signals; sixth means coupled to the fifth means to perform a modulo-2 addition of the third and fourth output signals resulting in a fifth output signal; and seventh means coupled to the sixth means to apply the fifth output signal as a feedback signal to the second means to modify the phase modulation of the phase modulated RF signals.

BRIEF DESCRIPTION OF THE DRAWING

Above-mentioned and other features and objects of this invention will become more apparent by reference to the following description taken in conjunction with the accompanying drawing, in which.

DESCRIPTION OF THE PREFERRED EMBODIMENTS

Figure 1:
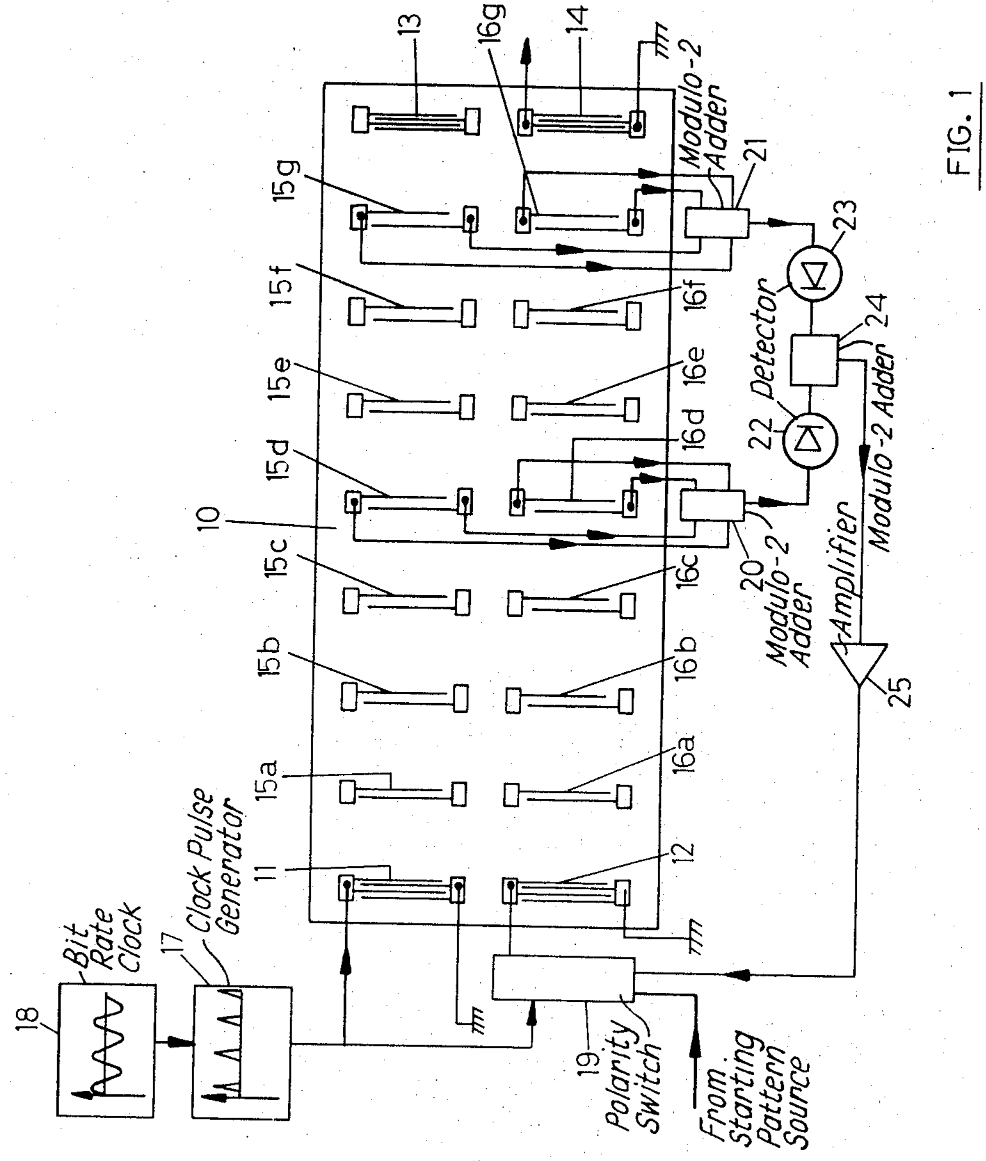
FIG. 1 is a diagrammatic illustration of a code generator arrangement using a surface acoustic wave tapped delay line in accordance with the principles of the present invention.

In the arrangement shown in FIG. 1 a piezoelectric body, typically of lithium niobate, has a flat surface 10 on which are deposited metallic conductor patterns to form surface acoustic wave transducers. Altogether two input transducers 11 and 12, two output transducers 13 and 14, and two sets of tapping point transducers 15*a*, 15*b* . . . 15*g* and 16*a*, 16*b* . . . 16*g* are provided to create two parallel, identical surface acoustic wave tapped delay lines. Both delay lines are driven by clock pulses from a pulse generator 17 which is driven in turn by a bit rate clock 18. The clock pulses are applied direct to input transducer 11. Transducer 11 acts like a filter and, due to its geometry, selects those frequency components of each pulse which make up the required RF frequency to launch an acoustic wave into the surface 10 of the piezoelectric material. Each wave corresponds to one bit period and constitutes what is termed the phase reference signal.

The clock pulses are also applied to a polarity switch 19 which is primarily under the control of starting pattern source (not shown). The starting pattern is a sequence of signals which represents a binary pattern. According to the significance of the binary pattern signals each pulse from pulse generator 17 is applied to transducer 12 either with its original polarity or an inverted polarity. This results in the RF frequency of the acoustic waves launched from transducer 12 being phase modulated by 180° in accordance with the bits of the binary pattern. The acoustic waves so launched are propagated in bit synchronizm with the acoustic waves of the phase reference signal. Once the number of bits required to complete the starting pattern has been received at the switch 19 the latter reverts to being under the control of the feedback signal.

The feedback signal is normally derived by taking the outputs of two tapping points, e.g., 16*d* and 16*g*, and performing a modulo-2 addition on these outputs. However, as explained previously, temperature effects are extremely important in surface acoustic wave delay lines. This is because the information is propagated in the form of a phase modulated RF carrier. Normally, in amplitude modulated systems, the maximum tolerable error amounts to approximately ± ½ bit. In the present case the maximum tolerable error is only ±90° of phase shift of the RF carrier. If the phase shift due to temperature effects exceeds ± 90° then the binary value of the bit is effectively inverted. To overcome this, for each tapping point from which an output is required the phase of the output is compared with the phase of the phase reference signal at the corresponding tapping point in the phase reference delay line. Thus, the outputs from transducers 15*d* and 16*d* are taken to a modulo-2 adder 20. If both inputs to the adder are in phase, or substantially in phase, with respect to the RF carrier, then an output will be obtained from adder 20. If, however, there is a phase difference of more than ± 90° of one input with respect to the other no output will be obtained. Similar modulo-2 addition of the outputs of tapping points 15*g* and 16*g* is performed in adder 21. The resultant outputs are detected by detectors 22 and 23 and the detected baseband signals are modulo-2 added in adder 24 to provide the feedback signal. The feedback signal is fed through amplifier 25 to the switch 19.

Figure 2:
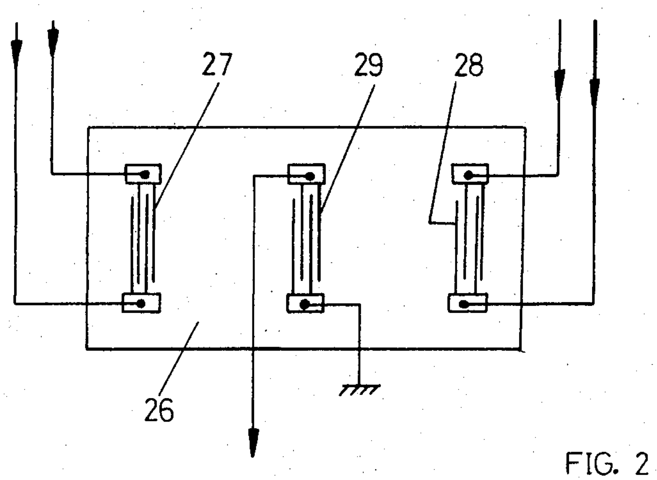
FIG. 2 is a diagrammatic illustration of a surface acoustic wave device functioning as a modulo-2 adder for use in conjunction with the arrangement of FIG. 1.

Modulo-2 adder 24 is a conventional circuit dealing with the outputs of detectors 22 and 23. However, adders 20 and 21 can be realized as surface acoustic wave devices, as illustrated in FIG. 2. Each device comprises a piezoelectric body on the flat surface 26 of which there is an arrangement of two input transducers 27 and 28 and one output transducer 29. The output transducer is equidistant from the two input transducers and receives acoustic waves launched from both of the input transducers. Input transducer 27 receives, for example, the output of tapping point transducer 15*d* while input transducer 28 receives the output of tapping point transducer 16*d*. If both inputs are in RF phase they will reinforce one another at the output transducer and a strong output will appear. If, however, both inputs are in an anti-phase relation they will cancel and no output will be obtained.

Figure 3:
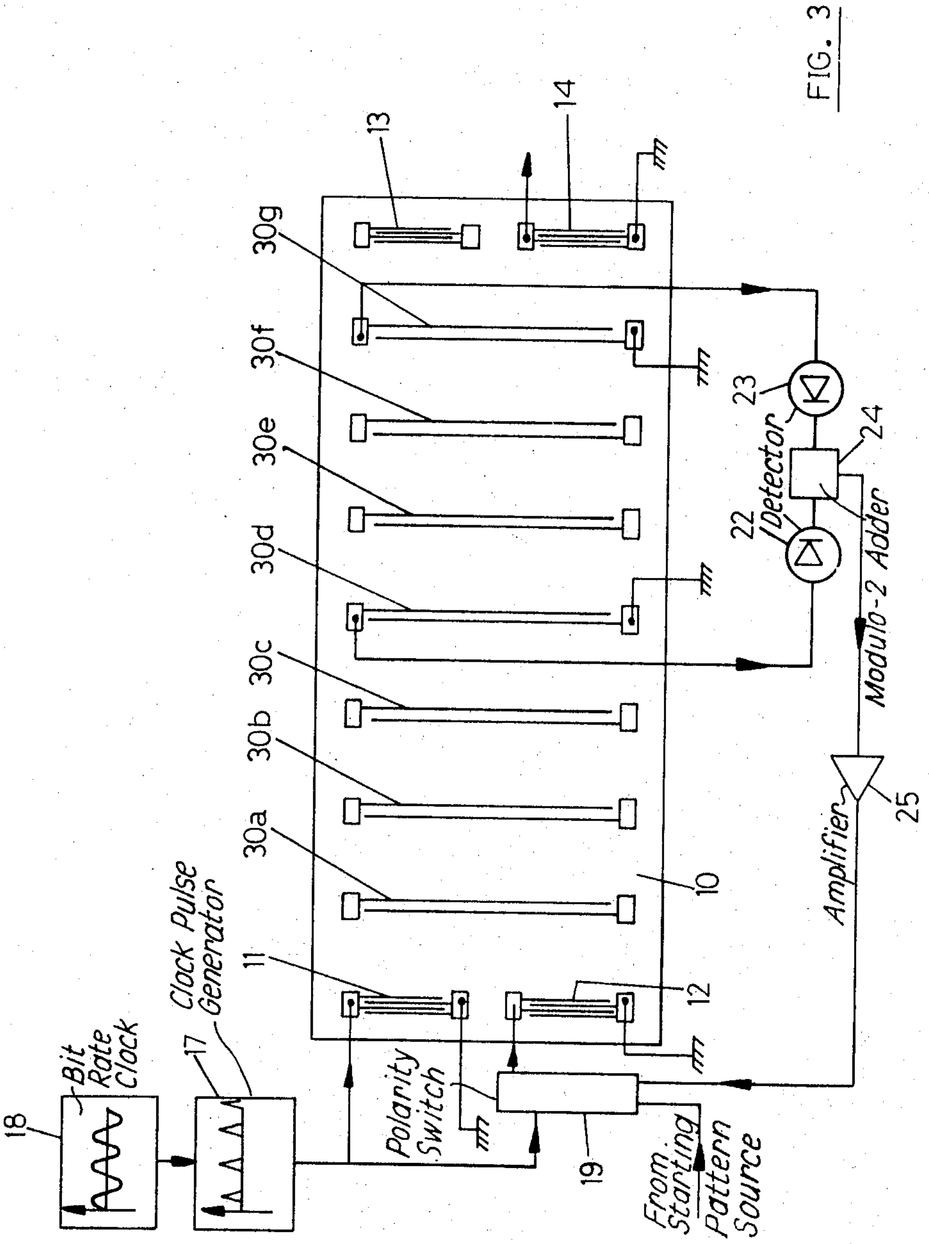
FIG. 3 is a diagrammatic illustration of one alternative to the arrangement of FIG. 1.

In the alternative arrangement shown in FIG. 3 the phase reference signal is still derived from a second delay line structure parallel to the code-generating delay line. But the tapping point transducers 30*a*, 30*b* . . . 30*g* are common to both delay lines. Modulo-2 addition of the phase reference signals and the code generating signals is now automatically accomplished at transducers 30*d* and 30*g*. The principle of addition is identical to that of the modulo-2 adder of FIG. 2. Both input transducers 11 and 12 are equidistant from tapping point transducer 30*d* and in-phase signals will add while anti-phase signals will cancel. The outputs of tapping point transducers 30*d* and 30*g* can now be taken directly to the detectors 22 and 23. The rest of the arrangement is the same as in FIG. 1.

Figure 4:
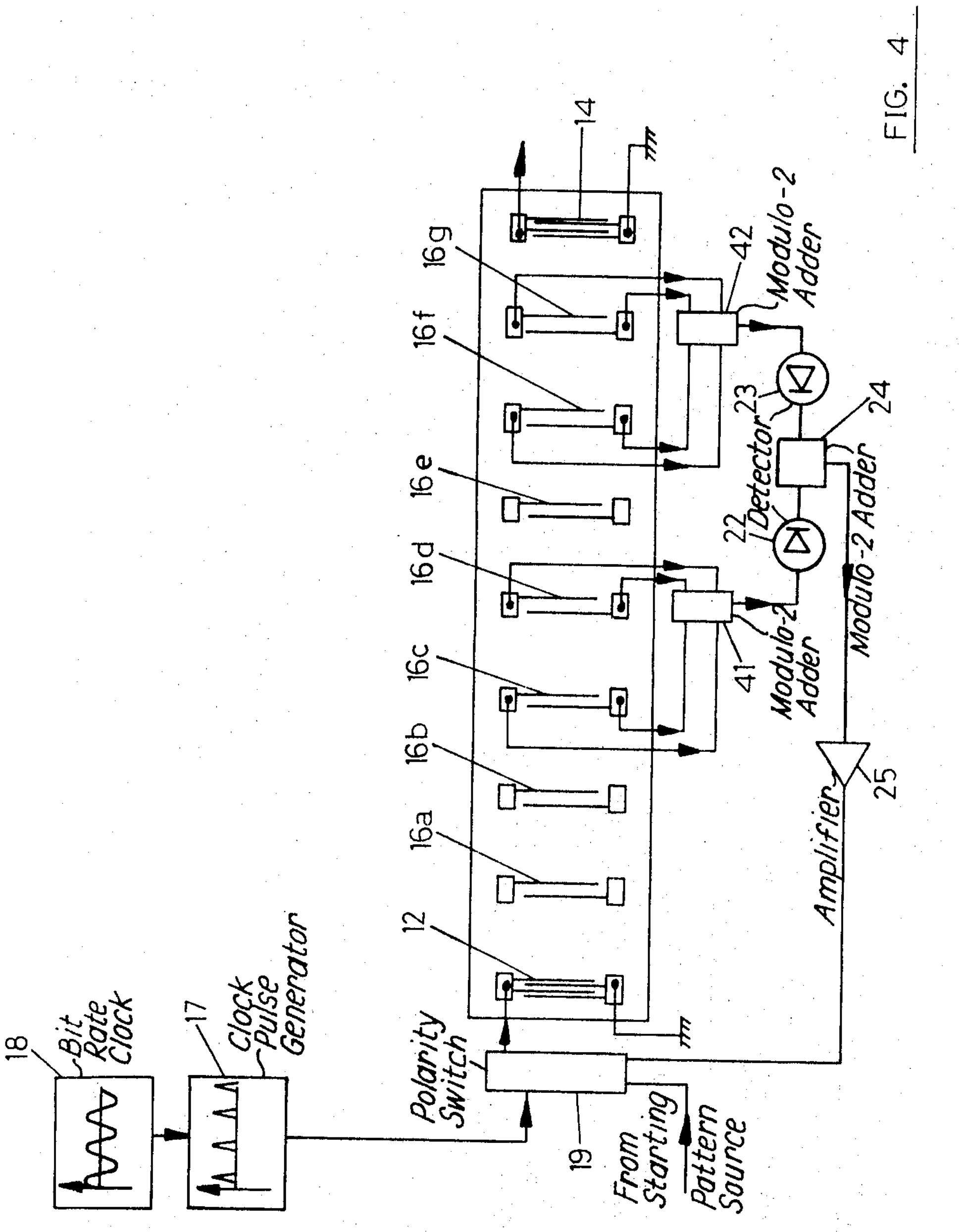
FIG. 4 is a diagrammatic illustration of another alternative to the arrangement of FIG. 1.

Another way of checking the RF phase at a tapping point is to compare it with the RF phase at an adjacent tapping point. The phase shift due to the temperature between two successive tapping points will only be small compared with the phase shift over the whole length of the delay line. FIG. 4 shows how this can be achieved. Only a single tapped delay line is required, namely, input transducer 12, tapping point transducers 16*a*, 16*b* . . . 16*g*, and output transducer 14. The output from the required tapping point 16*d* is applied to a modulo-2 adder 41 together with the output from tapping point 16*c*. A similar adder 42 adds the outputs of tapping points 16*g* and 16*f*. The modulo-2 added outputs are then detected and added as in the previous arrangements.

Figure 6:
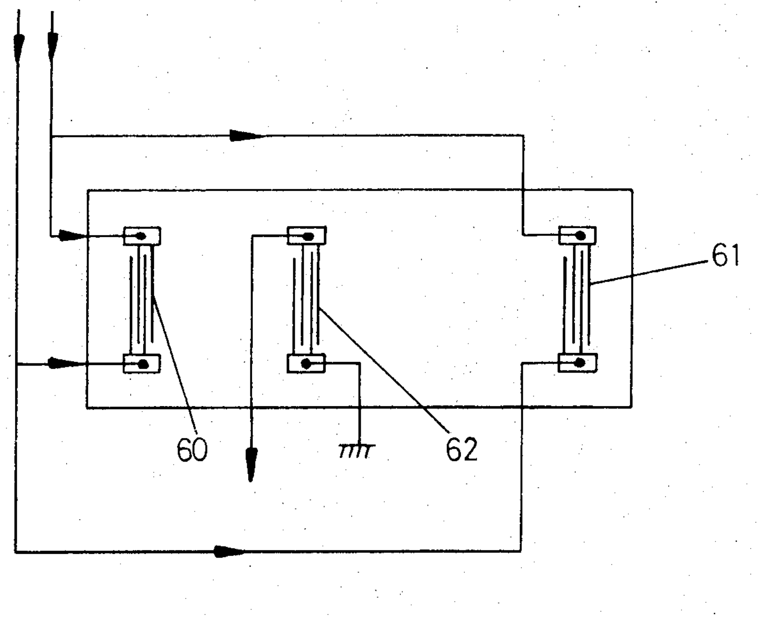
FIG. 6 is a diagrammatic illustration of an alternative form of a surface acoustic wave modulo-2 adder device to that of FIG. 2 for use with the arrangement of FIG. 5.
Figure 5:
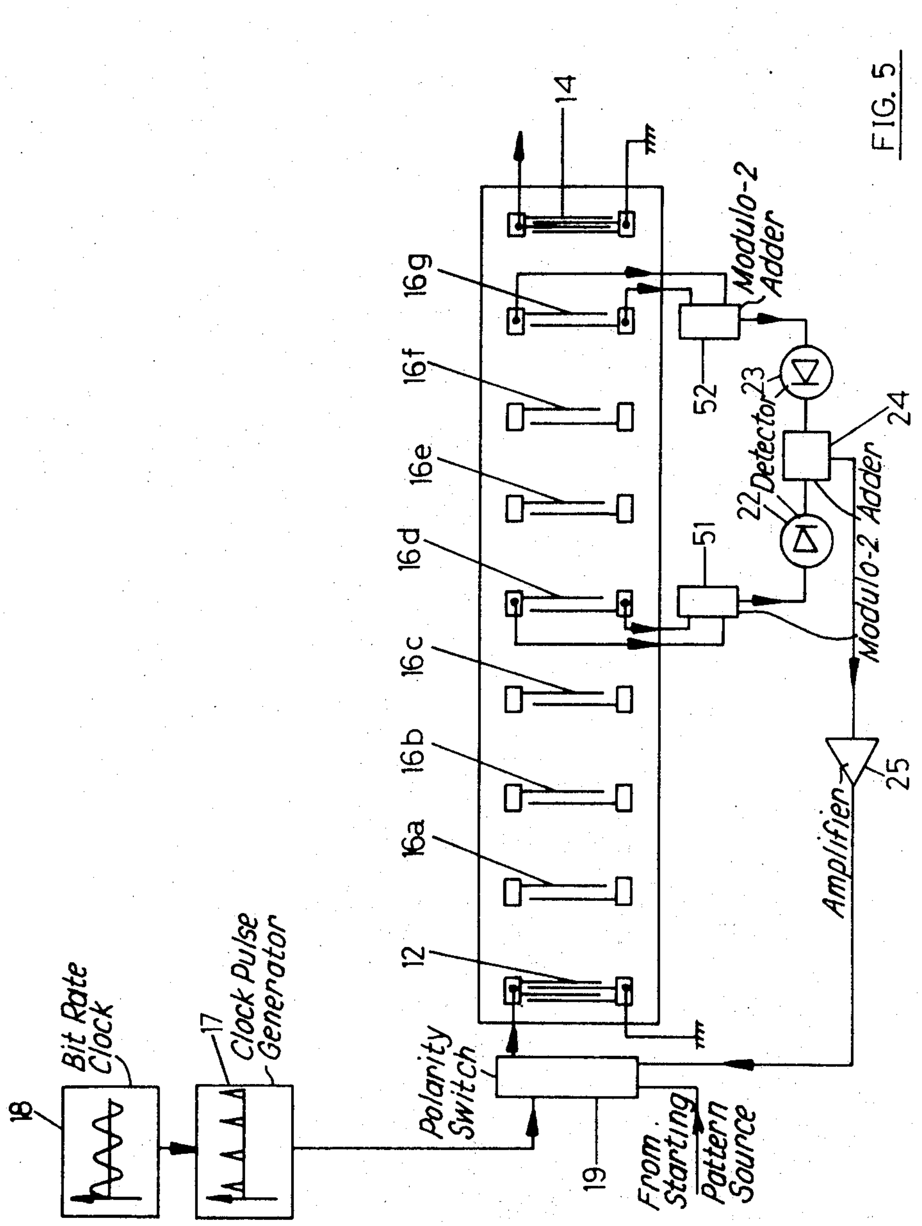
FIG. 5 is a diagrammatic illustration of yet another alternative to the arrangement of FIG. 1.

It will be apparent that in the FIG. 4 arrangement the output from tapping point 16*d* is in fact only the output from tapping point 16*c* delayed by one bit period. In other words, the two signals to be added in adder 41 are really the signal derived from one tap and the previous signal from the same tap. It is possible therefore to simplify the arrangement as shown in FIG. 5. The output of tapping point 16*d* alone is taken to a modified modulo-2 adder 51 in which the signal is divided into two paths, one of which incorporates the required delay. This is shown in FIG. 6. The principle is similar to that of the adder shown in FIG. 2 but input transducer 61 is spaced further from the output transducer 62 than input transducer 60. The difference in path lengths is sufficient to introduce a delay of one bit period in the arrival at the output transducer 62 of the acoustic waves from transducer 61 compared with those from transducer 60. The output of the tapping point 16*d* is thus applied to both input transducers 60 and 61 and the output of the adder is the modulo-2 addition of the tapping point signal with a delayed version of itself. Similarly, the output of tapping point 16*g* alone is taken to a modified modulo-2 adder 52 in which the signal is divided into two paths, one of which incorporates the required delay. Adder 52 is also as described above with respect to adder 51.

While we have described above the principles of our invention in connection with specific apparatus it is to be clearly understood that this description is made only by way of example and not as a limitation to the scope of our invention as set forth in the objects thereof and in the accompanying claims.

We claim:

1. A binary code generator comprising:

a first surface acoustic wave tapped delay line;

first means for generating clock signals having a repetition rate equal to the binary code bit rate;

second means coupled to said first means and said first delay line for inserting phase modulated RF signals into the input of said first delay line, said second means being under control of said clock signals;

third means coupled to said first delay line to derive first and second output signals from first and second tapping points of said first delay line;

fourth means to derive for said first and second tapping points first and second phase reference signals by which the RF phase of said first and second output signals of said first and second tapping points can be checked;

fifth means coupled to said first and second tapping points and said fourth means to compare said first and second output signals with respect to said first and second phase reference signals resulting in third and fourth output signals;

sixth means coupled to said fifth means to perform a modulo-2 addition of said third and fourth output signals resulting in a fifth output signal; and seventh means coupled to said sixth means to apply said fifth output signal as a feedback signal to said second means to modify said phase modulation of said phase modulated RF signals.

2. A generator according to claim 1, further including an output transducer for said first delay line; and wherein said second means includes an input transducer for said first delay line;

each of said input and output transducers is an interdigital transducer.

3. A generator according to claim 2, wherein each of said first and second tapping points is a single-finger-pair transducer.

4. A generator according to claim 1, wherein said fourth means includes a second surface acoustic wave tapped delay line parallel to said first delay line, said second delay line having a third tapping point corresponding to said first tapping point and a fourth tapping point corresponding to said second tapping point, an eighth means coupled to said second delay line for inserting therein RF signals modulated by said clock signals, and ninth means coupled to said second delay line to derive said first and second phase reference signals.

5. A generator according to claim 4, wherein said second delay line is fabricated identical to said first delay line.

6. A generator according to claim 4, wherein each of said third and fourth tapping points is a single-finger-pair transducer.

7. A generator according to claim 6, further including an output transducer for said second delay line; and wherein said eighth means includes an input transducer for said second delay line; each of said input and output transducers is an interdigital transducer.

8. A generator according to claim 7, wherein each of said first and second tapping points is a single-finger-pair transducer.

9. A generator according to claim 8, further including an output transducer for said first delay line; and wherein said second means includes an input transducer for said first delay line; each of said input and output transducers is an interdigital transducer.

10. A generatoor according to claim 4, wherein said second delay line includes an input transducer identical to an input transducer for said first delay line, an output transducer identical to an output transducer of said first delay line, said first and third tapping point having a first tapping point transducer common to said first and second delay lines, and said second and third tapping point having a second tapping point transducer common to said first and second delay lines.

11. A generator according to claim 1, wherein said first and second phase reference signals are the same as said first and second output signals but said first and second phase reference signals have a delay difference equal to one bit period from the associated one of said first and second output signals.

12. A generator according to claim 11, wherein said third means includes eighth means to derive sixth and seventh output signals from third and fourth tapping points each disposed adjacent a different one of said first and second tapping points, said sixth and seventh output signals being said first and second phase reference signals.

13. A generator according to claim 11, wherein said third means includes eighth means to derive from said first and second output signals sixth and seventh output signals each being a different one of said first and second output signals having a delay equal to one bit period, said sixth and seventh output signals being said first and second phase reference signals.

14. A generator according to claim 13, wherein said fifth means includes eighth means to perform a modulo-2 addition of said first output signals and one of said sixth and seventh output signals, and ninth means to perform a modulo-2 addition of said second output signal and the other of said sixth and seventh output signals.

15. A generator according to claim 14, wherein each of said eighth and ninth means includes a surface acoustic wave device having a first interdigital input transducer to which the associated one of said first and second output signals is applied, a second interdigital input transducer to which the associated one of said sixth and seventh output signals is applied and an interdigital output transducer disposed intermediate said first and second input transducers; the distance between said output transducer and one of said first and second input transducer being larger, by an amount equal to the distance between two adjacent delay line tapping points, than the distance between said output transducer and the other of said first and second input transducers.

16. A generator according to claim 1, wherein said fifth means includes eighth means to perform a modulo-2 addition of said first output signal and one of said first and second phase reference signal, and ninth means to perform a modulo-2 addition of said second output signal and the other of said first and second phase reference signal.

17. A generator according to claim 16, wherein each of said eighth and ninth means includes a surface acoustic wave device having two interdigital input transducers and an output transducer disposed intermediate of and equidistant from said two input transducers.

* * * * *